United States Patent
Kashiwada

(10) Patent No.: US 7,210,031 B2
(45) Date of Patent: Apr. 24, 2007

(54) ELECTRONIC APPARATUS USING A MEMORY CONTROLLER TO WRITE CONTROL PARAMETER IN A NONVOLATILE MEMORY INTO DUAL PORT RAM IN ACCORDANCE WITH POWER ON

(75) Inventor: Satoru Kashiwada, Sagamihara (JP)

(73) Assignee: Konica Minolta Business Technologies Inc., Tokyo (JP)

( * ) Notice: Subject to any disclaimer, the term of this patent is extended or adjusted under 35 U.S.C. 154(b) by 418 days.

(21) Appl. No.: 10/924,600

(22) Filed: Aug. 23, 2004

(65) Prior Publication Data

US 2005/0132181 A1 Jun. 16, 2005

(30) Foreign Application Priority Data

Dec. 15, 2003 (JP) .............................. 2003-415841

(51) Int. Cl.
*G06F 15/177* (2006.01)
(52) U.S. Cl. .......................................... 713/1; 358/444
(58) Field of Classification Search .................... 713/1, 713/320; 358/444

See application file for complete search history.

(56) References Cited

U.S. PATENT DOCUMENTS

| 6,038,252 | A | * | 3/2000 | Mizutani et al. ............. 375/222 |
| 6,298,370 | B1 | * | 10/2001 | Tang et al. .................. 718/102 |
| 6,449,662 | B1 | * | 9/2002 | Armitage ........................ 710/8 |
| 6,930,793 | B1 | * | 8/2005 | Namizuka et al. .......... 358/1.16 |
| 7,006,261 | B1 | * | 2/2006 | Mizutani et al. ............. 358/468 |
| 2004/0081143 | A1 | * | 4/2004 | Hirose ......................... 370/360 |

FOREIGN PATENT DOCUMENTS

JP 2003-032400 A 1/2003

* cited by examiner

*Primary Examiner*—Chun Cao
(74) *Attorney, Agent, or Firm*—Frishauf, Holtz, Goodman & Chick, P.C.

(57) ABSTRACT

An electric apparatus including a first controller and a second controller, a first memory which can access the first controller and the second controller, a nonvolatile memory which stores a first control parameter for the first control, a memory controller which manages the nonvolatile memory and writes the first control parameter stored in the nonvolatile memory into the memory in accordance with power ON.

26 Claims, 4 Drawing Sheets

ELECTRONIC APPARATUS USING A MEMORY CONTROLLER TO WRITE CONTROL PARAMETER IN A NONVOLATILE MEMORY INTO DUAL PORT RAM IN ACCORDANCE WITH POWER ON

FIELD OF THE INVENTION

The present invention relates to an electric apparatus for interfacing between two controls sections, particularly to an electronic apparatus characterized by a power saving mode.

BACKGROUND OF THE INVENTION

In such an apparatus as a multifunction device provided with a facsimile function, an overall control section for overall control of the operations of the entire system is configured independently of a communications control section for controlling the facsimile communications. The functions and loads are controlled separately between them through exchange of required information between these control sections, thereby meeting the requirements for a high degree of functionality and high speed.

When the control sections are separately configured, as described above, a variety of parameters required for the control of overall operation are usually stored in the nonvolatile memory of the overall control section, and are placed under collective management. The parameters for communications control are transferred from the overall control section to the communications control section.

To minimize power consumption, many of the electronic systems used on the wait mode for a long time such as a facsimile machine are provided with a power-saving mode. To maximize the power-saving effect, the various portions of the apparatus is turned off, except for the circuit that monitors the causes for returning, including user operations and incoming signals.

When the control section is divided into two sections: overall control section and communications control section, there are differences in initialization times after power has been turned on, and the overall control section handling a great amount of throughput starts up later than the communications control section. Thus, when power supply has turned on from the power-saving mode due to incoming signals, even if the communications control section has started, the parameters for communications control cannot be received from the overall control section if the overall control section has not yet started. A response to incoming signals cannot be made until the overall control section starts up, according to the prior art.

To solve this problem, an electronic apparatus (e.g. Official Gazette of Japanese Patent Tokkai 2003-32400) has been proposed, wherein the data such as communications control parameters to be transferred from a first controller (e.g. overall control section) to a second controller (e.g. communications control section) is stored into nonvolatile storage section that cannot be accessed by the second control section. When power has been turned on, the return mode is evaluated. If power supply has turned on from power-saving mode, data is sent to the RAM (Random Access Memory) of the second control section from the nonvolatile storage section, instead from the first control section.

In the prior art described in the in the Patent Document 1, when power has been turned on, evaluation is made to see if power supply has turned on from power-saving mode. After that, a data transfer method must be selected. This arrangement involves complicated processing after power turns on.

Further, the data has to be transferred from the nonvolatile storage section to the RAM of the second control section. Accordingly, data transfer is permitted only after termination of the initialization in the second control section. Thus, when data is read by a serial communications of low transfer speed from the nonvolatile memory of an EEPROM (Electrically Erasable and Programmable Programming Read Only Memory), a long time has to be spent before the second control section is enabled to get the required data from the RAM after power has been turned on. This has been a problem in the prior art.

In view of the prior art described above, it is an object of the present invention to solve the problem and to provide an electric apparatus ensuring early acquisition of the parameter required for the operation when power supply has turned on the power-saving mode.

SUMMARY OF THE INVENTION

An embodiment of the present invention includes a dual port RAM 41 that is accessible by a first controller 21 and a second controller 31 independently of each other; and a memory control circuit 42 for controlling the data read/write operations from and to a nonvolatile memory 37 connected under the command thereof; wherein the memory control circuit 42 further includes: a function for loading the data stored in the nonvolatile memory 37 into the dual port RAM 41 when a predetermined startup conditions have been met; and a function of writing the data written by the first control section 21 into the dual port RAM 41, into the nonvolatile memory 37.

According to the embodiment, allows the first control section 21 and second control section 31 to access the dual port RAM 41 independently of each other. When the first control section 21 has written into the dual port RAM 41 the data to be stored in the nonvolatile memory 37 or when a predetermined write command is issued after writing, the memory control circuit 42 writes the data from the dual port RAM 41 into the nonvolatile memory 37.

When a predetermined startup condition has been met, e.g. when the power has turned on, the memory control circuit 42 writes the data of the nonvolatile memory 37 into the dual port RAM 41. This procedure allows the same data as that stored in the nonvolatile memory 37 to be read from the dual port RAM 41 after the memory control circuit 42 writes the data of the nonvolatile memory 37 into the dual port RAM 41.

The type of startup condition does not affect the arrangement. In addition to turning on of power, the startup condition can be inputting of some form of startup signal from the control section and other circuits. The first control section 21 and second control section 31 can be arranged in any configuration so long as the second control section 31 is actuated by using the data provided by the first control section 21. There is no restriction to the functions or controls of each control section.

The data exchange speed is increased when 8-, 16- or 32-bit parallel communications are used for interface between the first control section 21, second control section 31 and dual port RAM 41. To put it another way, many of the less costly EEPROM use serial communications method to read and write data. Thus, data read/write speed is higher when the dual port RAM 41 is capable of parallel access than when direct access is made to the EEPROM.

Further, the memory control circuit 42 writes the data of the nonvolatile memory 37 automatically into the dual port RAM 41 when power has turned on. If the electric apparatus is turned on simultaneously with the first control section 21 and second control section 31, the data of the nonvolatile memory 37 is put into the dual port RAM 41 simultaneously with initialization by these control sections.

The present invention provides an electronic apparatus includes a first controller 21 and second control section 31; and a power-saving mode for turning off the power of a first controller 21 and second control section 31 in this power-saving mode, except for the circuit that monitors the causes for returning from at least this mode; wherein the electronic apparatus further includes: a dual port RAM 41 that is accessible by a first controller 21 and a second controller 31 independently of each other; a nonvolatile memory 37; and a memory control circuit 42 for controlling the data read and write operations from and to the nonvolatile memory 37; the electronic apparatus further characterized in that the first control section 21 writes into the dual port RAM 41 the data used by the second control section 31; the memory control circuit 42 writes into the nonvolatile memory 37 the data written by the first control section 21 into the dual port RAM 41, and loads the data of the nonvolatile memory 37 into the dual port RAM 41 at the same time when power has turned on; and the second control section 31 operates by obtaining data from the dual port RAM 41.

According to the embodiment, allows parallel execution of initialization by the first control section 21 and second control section 31, and capturing the data of the nonvolatile memory 37 into the dual port RAM 41 by the memory control circuit 42 when power has turned on, including the case of turning on from the power-saving mode. Even if the initialization of the first control section 21 has not yet completed upon termination of the initialization by the second control section 31, the second control section 31 is capable of performing operations by reading the data required by the first control section 21 from the dual port RAM 41.

The present invention provides the aforementioned electronic apparatus wherein the second control section 31 provides facsimile communications control and monitors at least the presence/absence of incoming signals.

According to the embodiment, upon turning on of power from the power-saving mode as a result of receiving incoming signals, the second control section 31 is capable of reading the required parameter from the dual port RAM 41, prior to termination of the initialization of the first control section 21, and giving a reply to incoming signals.

BRIEF DESCRIPTION OF THE DRAWINGS

FIG. 3 is an explanatory view showing the operation of the DPRAM interface automatically started when the power supply has turned on;

DETAILED DESCRIPTION OF THE PREFERRED EMBODIMENT

Figure 2:
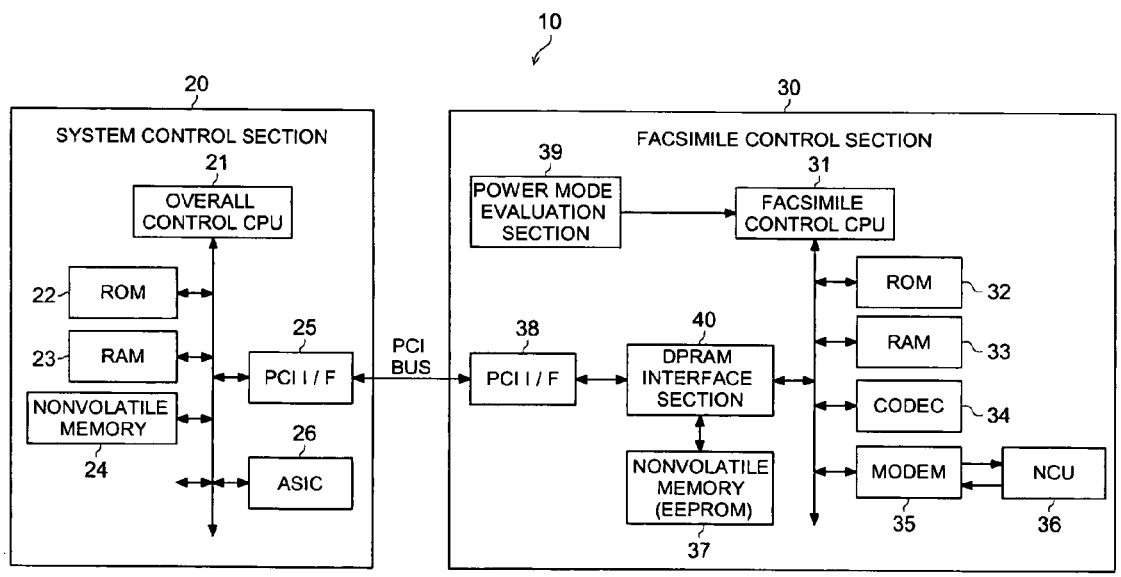
FIG. 2 is a block diagram representing the configuration of a multifunction device as an embodiment of the present invention.

The following describes the preferred embodiment of the present invention with reference to drawings:

FIG. 2 shows the schematic configuration of a multifunction device 10 as an electronic apparatus with a memory apparatus of the present invention mounted thereon. The multifunction device 10 provides a facsimile function and printer function, in addition to the function of reading an original image, forming its duplicated image on recording paper and outputting it.

The multifunction device 10 has a system control section 20 for administration and control of the operations of the multifunction device 10, and a facsimile control section 30 for providing communications control related to facsimile communications. The system control section 20 is provided with the overall control CPU 21, ROM (Read Only Memory) 22, RAM (Random Access Memory) 23, nonvolatile memory 24, PCI (Peripheral Components Interconnect) interface section 25 and ASIC (Application Specific Integrated Circuit) 26.

The overall control CPU 21 performs the function of administering and controlling the operation of the multifunction device 10. The ROM 22 is a read only memory for storing the program executed by the overall control CPU 21 and other fixed data. The RAM 23 is a memory for temporary storage of the data required for the operation of the overall control CPU 21 and the image data.

The nonvolatile memory 24 is a memory that keeps the stored data undeleted even after power has been turned off. It stores, for example, control parameters for controlling the overall operation of the multifunction device 10, namely, various parameters and settings. The PCI interface section 25 is a circuit for interconnection between the bus of the overall control CPU 21 and PCI bus. Data exchange between the system control section 20 and facsimile control section 30 is performed through the PCI bus. The ASIC 26 is an integrated circuit for decoding addresses and performing other functions.

The facsimile control section 30 contains a facsimile control CPU 31, ROM 32, RAM 33, CODEC (COlder DECoder) 34, MODEM (MOdulator-DEModulator) 35, NCU (Network Control Unit) 36, DPRAM interface section 40 as a memory apparatus, nonvolatile memory 37, PCI interface section 38 and power mode evaluation section 39.

The facsimile control CPU 31 controls the facsimile transmission and reception operations. The ROM 32 stores the program run by the facsimile control CPU 31 and various fixed data. The RAM 33 temporarily stores the data required for the operation of the facsimile control CPU 31 and image data to be transmitted and received.

The CODEC 34 performs the function of encoding the image data to be received, and decoding encoded data to the original data, according to a predetermined regulation. The MODEM 35 converts (modulates) digital data into the audio signal that can be transmitted to a telephone line, and converts (demodulates) the audio signal received through the telephone line into digital data. The NCU 36 sends the dial signal for calling a party for communications and detects incoming signals.

The PCI interface section 38 is connected with the PCI bus from the system control section 20. The DPRAM interface section 40 is located between the bus of the facsimile control CPU 31 and PCI interface section 38 and is used for exchange of data between the facsimile control CPU 31 and overall control CPU 21. The nonvolatile memory 37 is a memory for storing various parameters to be referenced when the facsimile control section 30 operates, and is connected to the DPRAM interface section 40. The EEPROM of the type for inputting and outputting data through a serial interface is used in the nonvolatile memory 37.

When power is supplied to the facsimile control section 30, the power mode evaluation section 39 determines whether power is turned on from where the main power supply was off (hereinafter referred to as "main power supply on"), or power is turned on from the power-saving mode (hereinafter referred to as "power-saving mode"). When the main power supply is off, the power supply of the multifunction device 10 as a whole is turned off.

In the power-saving mode, the power supply is turned off, except for the circuit that monitors the causes for turning on from the power-saving mode. To put it more specifically, it includes the operation section for accepting user operations, the section for monitoring whether the electric apparatus receive a data from the external device or not (NCU 36) and a circuit (not illustrated) for turning on the power of each section when causes for turning on of power have been detected by the operation section or monitoring section.

The system control section 20 is connected with a scanner section (not illustrated), printer section and operation display section. The scanner section scans an original image and the printer section forms an image on recording paper and outputs it. The operation display section displays the information on various operation guidance and operation state for a user, and accepts various operations from the user.

Figure 1:
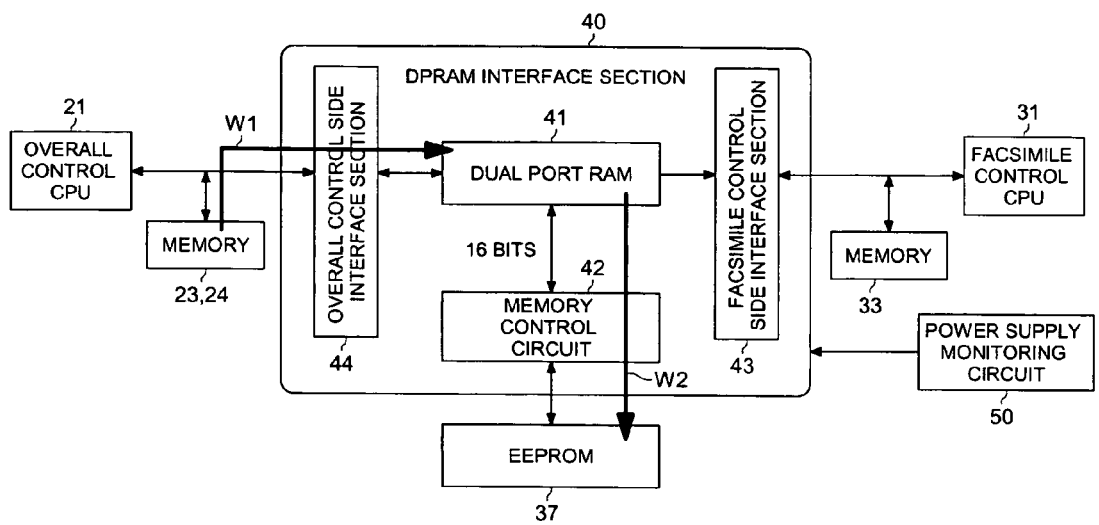
FIG. 1 is a block diagram representing the configuration of a DPRAM interface section as an embodiment of the present invention and connections with peripheral circuits.

FIG. 1 shows the configuration of the DPRAM interface section 40 and the connection status of the peripheral circuit. The DPRAM interface section 40 contains a dual port RAM 41, memory control circuit 42, facsimile control side interface section 43 and overall control side interface section 44. The overall control CPU 21 can access the dual port RAM 41 through the overall control side interface section 44, while the facsimile control CPU 31 can access the dual port RAM 41 through the facsimile control side interface section 43. The memory control circuit 42 writes the data stored in the dual port RAM 41, into the nonvolatile memory 37, reads the data from the nonvolatile memory 37 and stores it into the dual port RAM 41 controlled by the memory control circuit 42.

Data of a maximum 32-bit bus width can be read and written from the side of the overall control CPU 21 through the PCI bus, and access from-the facsimile control CPU 31 is made in terms of 16-bit bus width. The data of 16-bit bus width is exchanged between the dual port RAM 41 and memory control circuit 42, and data is exchanged between the memory control circuit 42 and nonvolatile memory 37 in serial communication.

Further, the DPRAM interface section 40 has a command response dual port RAM (not illustrated) for exchanging commands and response between the overall control CPU 21 and facsimile control CPU 31. The reset signal from the power supply monitoring circuit 50 for monitoring the power supply status of the facsimile control section 30 is inputted into the memory control circuit 42 of the DPRAM interface section 40. The power supply monitoring circuit 50 releases the reset signal about 50 ms after the +5 volt power is supplied.

Figure 3:
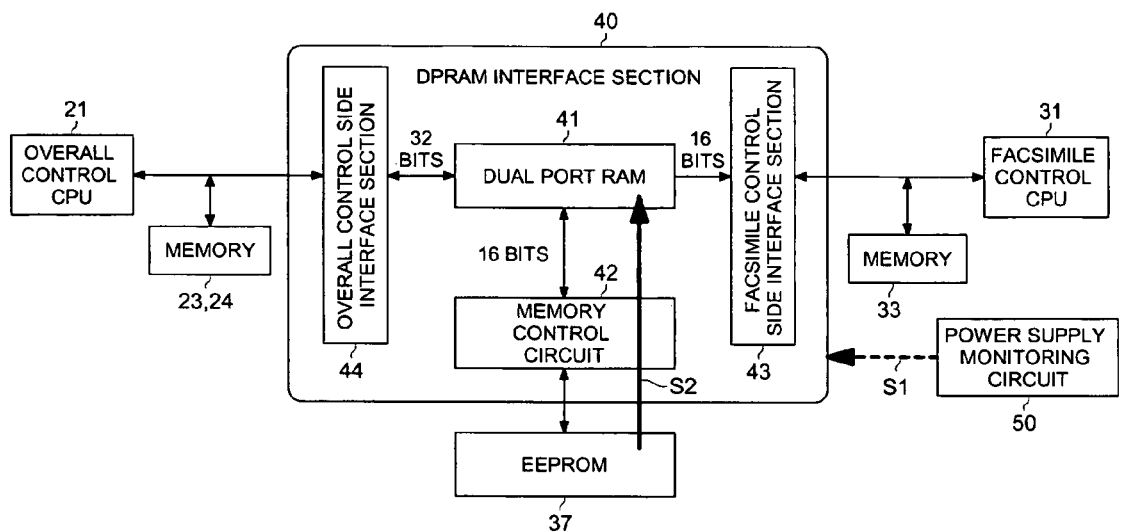

FIG. 3 shows the operation when the power supply of the DPRAM interface section 40 has turned on. If power turns on despite the logic on the side of the system control section 20, and the reset signal from the power supply monitoring circuit 50 of the facsimile control section 30 has been released (Si), the memory control circuit 42 reads all data from the external nonvolatile memory 37 and writes it in the dual port RAM 41 (S2). When all data has been loaded into the dual port RAM 41, an internal valid flag (not illustrated) is set at "1"; thus, access to the dual port RAM 41 from the facsimile control CPU 31 and overall control CPU 21 are enabled.

Figure 4:
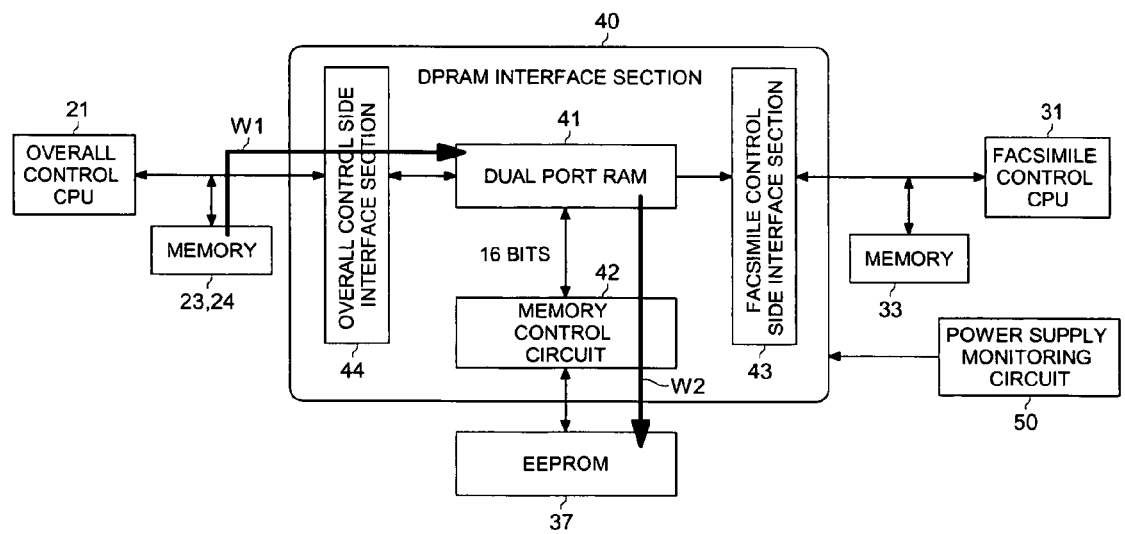
FIG. 4 is an explanatory view showing the operation performed when data is transferred to the dual port RAM from the overall control CPU.

FIG. 4 shows the operations when data is sent to the dual port RAM 41 from the overall control CPU 21. The overall control CPU 21 writes the data read from the nonvolatile memory 24 on the side of the system control section 20, into the dual port RAM 41 of the DPRAM interface section 40 (W1). The data written into the dual port RAM 41 is written into the nonvolatile memory 37 by the memory control circuit 42 (W2).

Figure 5:
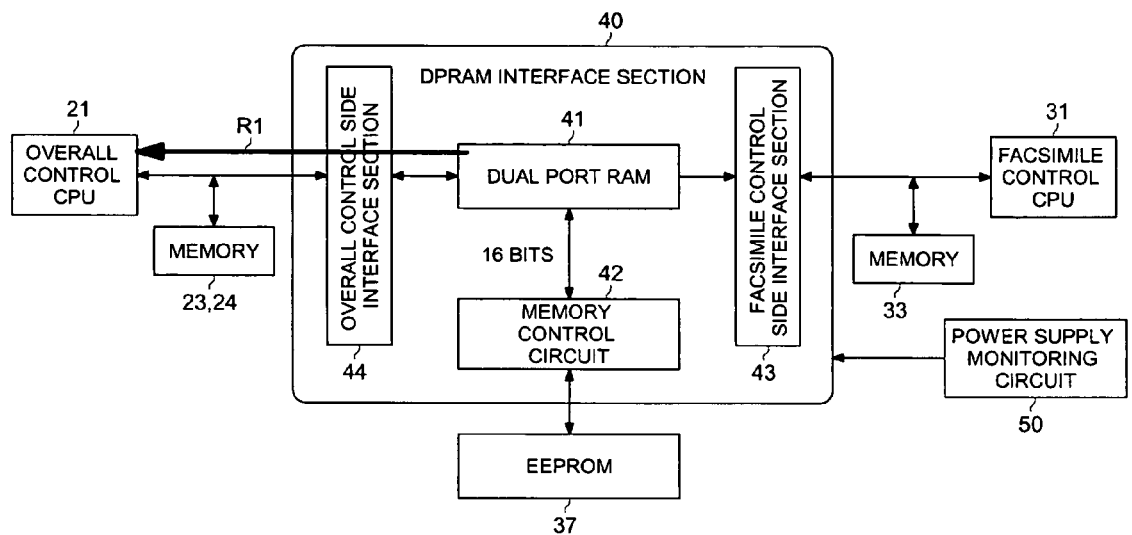
FIG. 5 is an explanatory view showing the operation performed when the overall control CPU reads the data stored in the dual port RAM of the DPRAM interface.

FIG. 5 shows the operation when reading the data stored in the dual port RAM 41 of the DPRAM interface section 40. When power is on, all the data stored in the nonvolatile memory 37 is loaded into the dual port RAM 41. Thus, by reading the data of the dual port RAM 41 (R1), the overall control CPU 21 indirectly reads the data stored in the nonvolatile memory 37. In cases where the overall control CPU 21 reads the data of the dual port RAM 41, inspection is made by means of a checksum to see whether the data stored in the nonvolatile memory 37 is damaged or not.

Figure 6:
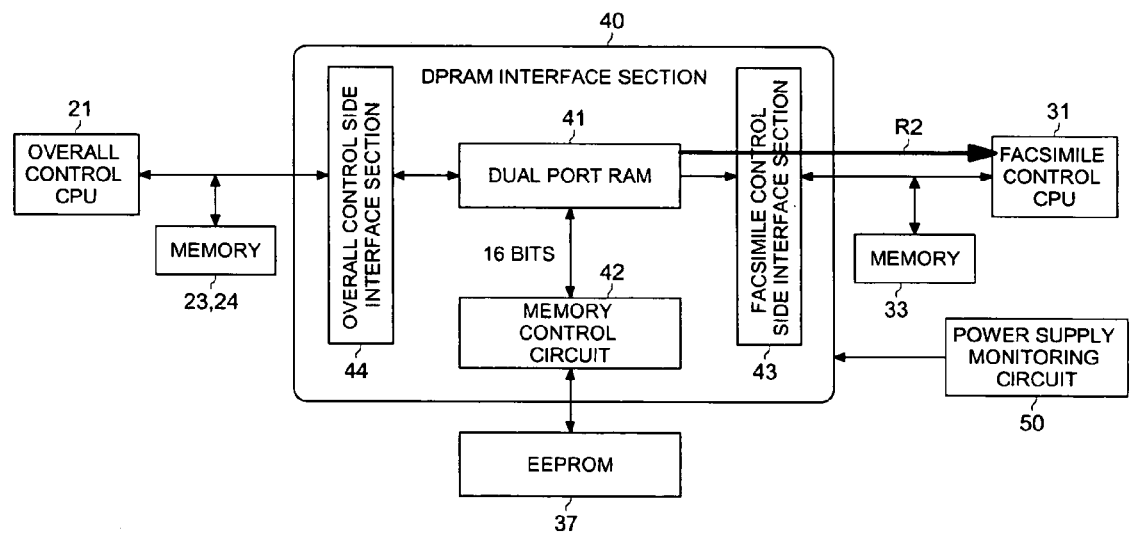
FIG. 6 is an explanatory view showing the operation performed when the facsimile control CPU reads the data stored in the dual port RAM of the DPRAM interface.

FIG. 6 shows the operation when the facsimile control CPU 31 reads the data stored in the dual port RAM 41 of the DPRAM interface section 40. When power supply is on, all the data stored in the nonvolatile memory 37 is loaded into the dual port RAM 41. Thus, by reading the data of the dual port RAM 41 (R2), the facsimile control CPU 31 indirectly reads the data stored in the nonvolatile memory 37. In this case, data cannot be written into the dual port RAM 41 from the facsimile control CPU 31.

The following describes the operations of turning on or off the power supply in the multifunction device 10, and going in or out of the power-saving mode. The multifunction device 10 enters the power-saving mode automatically if the wait state continues for more than a predetermined time, without user operation or incoming signals. In this case, as described above, power supply is off except for the portion that monitors the causes for turning on of power.

Figure 7:
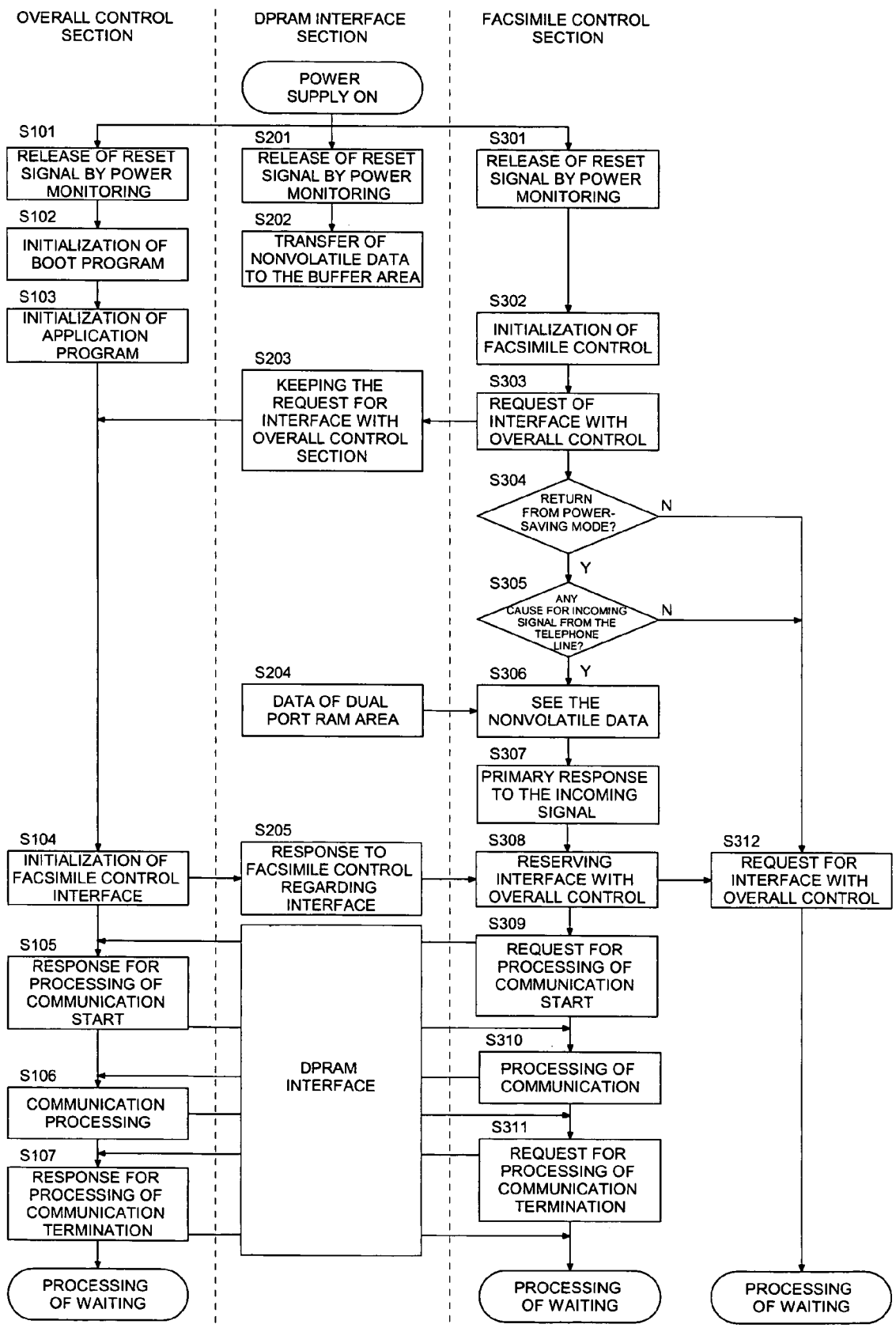
FIG. 7 is a flowchart showing the operation of each portion when the power supply has turned on from either the main supply-on mode or power-saving mode.

FIG. 7 shows a flow of the operation of each portion that is performed when power is on, independently of whether the power supply has turned on from main supply-on mode or from power-saving mode. If power supply is on, the reset signal from the power supply monitor circuit is released in each of the system control section 20, facsimile control section 30 and DPRAM interface section 40 (S101, S201 and S301).

When the reset signal is released, the overall control CPU 21 of the system control section 20 applies processing of initialization by the boot program (S102). It also applies the processing of initialization by the application program (S103). After power supply is turned on, about 20 through 30 seconds are required before termination of such processing of initialization.

When the reset signal from the power supply monitor circuit is released, the facsimile control CPU 31 of the facsimile control section 30 also applies processing of initialization (S302). This processing of initialization terminates in several milliseconds through several seconds. When the reset signal is released, the DPRAM interface section 40 applies the processing of loading the data of the nonvolatile memory 37 into the dual port RAM 41 (S202). This processing terminates in several milliseconds through several tens of milliseconds. Upon termination, a valid flag is set.

Upon termination of initialization, the facsimile control CPU 31 requests the overall control CPU 21 through the dual port RAM for command response to reserve an interface with the system control section 20 (S303 and S203). Further, by referring to the power mode evaluation section 39, evaluation is made to see if power has turned on from main supply-on mode or power-saving mode (S304). If power has turned on from power-saving mode (S304: Y), evaluation is made to see if turning on of power has been caused by an incoming signal from the telephone line or not (S305).

If the turning on of power has been caused by incoming signals (S305: Y), required parameters are read from the dual port RAM 41 of the DPRAM interface section 40 (S306 and S204). Based on them, a primary response is given to the incoming signal (S307). For example, a response for responding to the telephone number report function is returned, and processing is applied to maintain the access of the line.

While access to the line is maintained by the primary response, the initialization of the overall control CPU 21 terminates in time. Then the overall control CPU 21 reads the request for reserving an interface, stored in the dual port RAM 41. Based on this request, the overall control CPU 21 carries out initialization of facsimile control interface (S104).

Then a response to show termination of securing an interface to the facsimile control section 30 is reported by the overall control CPU 21 to the facsimile control CPU 31 through dual port RAM for command response (S205). When an interface with the system control section 20 has been reserved (S308), the facsimile control CPU 31 applies processing of facsimile communication by exchanging data with the overall control CPU 21 (S309 through S311 and S105 through S107). Upon termination of communication, the overall control CPU 21 and facsimile control section 30 enter the wait mode for a predetermined period of time, and then enter the power-saving mode.

When the overall control CPU 21 cannot return from the power-saving mode (S304: N) or it has returned from the power-saving mode without being caused by incoming signals (S305: N), there is need of applying the processing of primary response to the incoming signal. The system waits for a response from the overall control CPU 21 showing that an interface has been reserved. After confirming that an interface has been reserved (S312), processing of waiting starts.

As described above, when the power supply has turned on, the data of the nonvolatile memory 37 is automatically loaded into the dual port RAM 41. When the system has returned from the power-saving mode due to incoming signal, it is possible to get the required parameter from the dual port RAM 41 and to give a primary response, without waiting for the termination of the initialization of the overall control CPU 21.

The embodiment of the present invention has been described with reference to drawings. It should be understood that a specific arrangement of the present invention is not restricted to the embodiment described above. The present invention can be embodied in a great number of variations with appropriate modification and improvement, without departing from the spirit of the present invention.

For example, it is also possible to make such arrangements that data can be written into the dual port RAM 41 from the facsimile control CPU 31. In the aforementioned embodiment, when the overall control CPU 21 has written data in the dual port RAM 41, the data is automatically written into the nonvolatile memory 37 by the memory control circuit 42. It is also possible to arrange such a configuration that the data is written in the nonvolatile memory 37 upon receipt of a predetermined write command.

The electronic apparatus using the same allow access to be made to a dual port RAM, instead of a nonvolatile memory. Thus, the first control section and second control section are capable of reading and writing the data to be stored into the nonvolatile memory, independently of each other, without each giving any load to the other. This arrangement ensures easy data exchange.

In cases where the data of the nonvolatile memory is loaded into the dual port RAM by turning on of power, data is loaded from the nonvolatile memory into the dual port RAM, concurrently as the first control section and second control section are engaged in initialization after turning on of power. This arrangement reduces the time required before the second control section is enabled to get the data from the dual port RAM, subsequent to turning on of power.

Further, when the first control section stores the data to be transferred to the second control section, in the nonvolatile memory in advance, then the second control section can capture the parameter from the dual port RAM, without having to wait for initialization of the first control section, after power has turned on. This allows processing to be carried out by the second control section alone. Especially when the second control section 31 controls the facsimile communications, it is possible to get the required parameters from the dual port RAM and to give a response to incoming signals, prior to termination of the initialization of the first control section, if power supply has turned on from the power-saving mode due to incoming signals.

What is claimed is:

1. An electric apparatus comprising:
   a first controller, which manages a first control;
   a second controller, which manages a second control;
   a first memory, which the first controller and the second controller are accessible to;
   a nonvolatile memory, which stores a first control parameter for the first control; and
   a memory controller, which manages the nonvolatile memory, wherein the memory controller writes the first control parameter stored in the nonvolatile memory into the first memory in accordance with power ON.

2. The electric apparatus of claim 1, wherein the first controller manages the first control based on the first control parameter before an initialization of the second controller is completed.

3. The electric apparatus of claim 2, wherein the first controller manages a communication with an external device, and the second controller manages a control of the electric apparatus.

4. The electric apparatus of claim 3, further comprising:
   a monitor, which monitors whether the electric apparatus receive a data from the external device or not,
   wherein in case the power on is caused by receiving the data from the external device, the first controller manages the communication based on the first control parameter before the initialization of the second controller is completed.

5. The electric apparatus of claim 2, wherein the second controller comprises a second memory, which stores a second control parameter for the first control and the second control,
wherein the second control parameter is stored into the first memory.

6. The electric apparatus of claim 5, wherein the memory controller writes the second control parameter stored in the first memory into the nonvolatile memory.

7. The electric apparatus of claim 5, wherein the first controller manages the first control based on the second control parameter.

8. The electric apparatus of claim 1, wherein the first controller manages a communication with an external device, and the second controller manages a control of the electric apparatus.

9. The electric apparatus of claim 8, wherein the first controller manages the first control based on the first control parameter before an initialization of the second controller is completed.

10. The electric apparatus of claim 9, further comprising:
a monitor, which monitors whether the electric apparatus receive a data from the external device or not,
wherein in case the power on is caused by receiving the data from the external device, the first controller manages the communication based on the first control parameter before the initialization of the second controller is completed.

11. The electric apparatus of claim 9, wherein the second controller comprises a second memory; which stores a second control parameter for the first control and the second control,
wherein the second control parameter is stored into the first memory.

12. The electric apparatus of claim 11, wherein the memory controller writes the second control parameter stored in the first memory into the nonvolatile memory.

13. The electric apparatus of claim 11, wherein the first controller manages the first control based on the second control parameter.

14. An electric apparatus controlling method, comprising steps of:
managing a first control by a first controller,
managing a second control by a second controller,
accessing the first controller or the second controller to a first memory,
storing a first control parameter in a nonvolatile memory for the first control, and
writing the first control parameter stored in the nonvolatile memory into the first memory by the memory controller in accordance with power on.

15. The electric apparatus controlling method of claim 14, further comprising step of:
managing the first control based on the first control parameter before an initialization of the second controller is completed.

16. The electric apparatus controlling method of claim 15, wherein the first controller manages a communication with an external device, and the second controller manages a control of the electric apparatus.

17. The electric apparatus controlling method of claim 16, further comprising steps of:
monitoring whether the electric apparatus receive a data from the external device or not, and
managing the communication based on the first control parameter before the initialization of the second controller is completed in case the power on is caused by receiving the data from the external device.

18. The electric apparatus controlling method of claim 15, further comprising steps of:
storing a second control parameter for the first control and the second control in a second controller of the second memory, and
storing the second control parameter stored in the second memory into the first memory.

19. The electric apparatus controlling method of claim 18, further step of:
writing the second control parameter stored in the first memory into the nonvolatile memory by the memory controller.

20. The electric apparatus controlling method of claim 18, further step of:
managing the first control based on the second control parameter stored in the first memory.

21. The electric apparatus controlling method of claim 14, wherein the first controller manages a communication with an external device, and the second controller manages a control of the electric apparatus.

22. The electric apparatus controlling method of claim 21, further comprising step of:
managing the first control based on the first control parameter before an initialization of the second controller is completed.

23. The electric apparatus controlling method of claim 22, further comprising steps of:
monitoring whether the electric apparatus receive a data from the external device or not,
managing the communication based on the first control parameter before the initialization of the second controller is completed in case the power on is caused by receiving the data from the external device.

24. The electric apparatus controlling method of claim 22, further comprising steps of:
storing a second control parameter for the first control and the second control in a second controller of the second memory, and
storing the second control parameter stored in the second memory into the first memory.

25. The electric apparatus controlling method of claim 24, further step of:
writing the second control parameter stored in the first memory in the nonvolatile memory by the memory controller.

26. The electric apparatus controlling method of claim 24, further step of:
managing the first control based on the second control parameter stored in the first memory.

* * * * *